United States Patent
Mola

(10) Patent No.: US 10,268,558 B2
(45) Date of Patent: Apr. 23, 2019

(54) EFFICIENT BREAKPOINT DETECTION VIA CACHES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/405,849

(22) Filed: Jan. 13, 2017

(65) Prior Publication Data

US 2018/0203780 A1    Jul. 19, 2018

(51) Int. Cl.

| | |
|---|---|
| *G06F 9/44* | (2018.01) |
| *G06F 11/30* | (2006.01) |
| *G06F 11/34* | (2006.01) |
| *G06F 12/0891* | (2016.01) |
| *G06F 11/36* | (2006.01) |
| *G06F 12/0802* | (2016.01) |
| *G06F 12/12* | (2016.01) |

(52) U.S. Cl.
CPC .......... *G06F 11/3037* (2013.01); *G06F 11/34* (2013.01); *G06F 11/3471* (2013.01); *G06F 11/362* (2013.01); *G06F 11/3636* (2013.01); *G06F 11/3648* (2013.01); *G06F 12/0802* (2013.01); *G06F 12/0891* (2013.01); *G06F 12/12* (2013.01); *G06F 2212/1016* (2013.01)

(58) Field of Classification Search
CPC ............ G06F 11/3466; G06F 11/3471; G06F 11/362; G06F 11/3636; G06F 12/0875; G06F 2201/86; G06F 2201/885
See application file for complete search history.

(56) References Cited

U.S. PATENT DOCUMENTS

| | | |
|---|---|---|
| 5,535,318 A | 7/1996 | Motoyama et al. |
| 6,106,572 A | 8/2000 | Halpern |
| 6,182,208 B1 | 1/2001 | Peri et al. |
| 6,237,135 B1 | 5/2001 | Timbol |
| 6,240,545 B1 | 5/2001 | Carmichael et al. |
| 6,795,962 B1 | 9/2004 | Hanson |
| 7,000,225 B2 | 2/2006 | Sangavarapu et al. |

(Continued)

OTHER PUBLICATIONS

Barr, et al., "Tardis: affordable time-travel debugging in managed runtimes", In Proceedings of the ACM International Conference on Object Oriented Programming Systems Languages & Applications, Oct. 20, 2014, 16 pages.

(Continued)

*Primary Examiner* — Duy Khuong T Nguyen
(74) *Attorney, Agent, or Firm* — Workman Nydegger

(57) ABSTRACT

Efficient breakpoint detections via caches comprises monitoring a memory location by detecting cache misses on a cache. A memory address that is to be monitored is stored in a monitoring list, and any cache line overlapping with the memory address is evicted if it exists in a cache. When the occurrence of a cache miss based on a memory access operation is detected, a determination is made as to whether a portion of a cache line imported into the cache based on the cache miss overlaps with the memory address stored in the monitoring list. When there is an overlap, one or more monitoring operations are processed on the memory address, and the imported cache line is evicted from the cache.

20 Claims, 4 Drawing Sheets

(56) References Cited

U.S. PATENT DOCUMENTS

| | | | |
|---|---|---|---|
| 7,249,225 B1* | 7/2007 | Seidl | G06F 12/0815 707/999.103 |
| 7,269,825 B1* | 9/2007 | Adcock | G06F 12/1027 711/113 |
| 7,296,259 B2* | 11/2007 | Betker | G06F 11/3648 712/227 |
| 7,694,278 B2 | 4/2010 | Pasumansky et al. | |
| 7,840,849 B2 | 11/2010 | O'Callahan | |
| 8,423,965 B2 | 4/2013 | Goel et al. | |
| 8,539,209 B2* | 9/2013 | Pogor | G06F 11/3648 712/225 |
| 8,578,340 B1 | 11/2013 | Daudel et al. | |
| 8,656,359 B2 | 2/2014 | Savov | |
| 8,832,659 B2* | 9/2014 | Ceze | G06F 8/314 717/124 |
| 9,021,444 B2 | 4/2015 | Garrett et al. | |
| 9,032,374 B2 | 5/2015 | Munson et al. | |
| 2003/0061599 A1 | 3/2003 | Bates et al. | |
| 2003/0106045 A1 | 6/2003 | Arnold et al. | |
| 2004/0172623 A1 | 9/2004 | Eckels et al. | |
| 2004/0225920 A1 | 11/2004 | Bates et al. | |
| 2006/0101405 A1 | 5/2006 | Buschardt et al. | |
| 2007/0168736 A1 | 7/2007 | Ottavi et al. | |
| 2008/0196013 A1 | 8/2008 | Sim | |
| 2009/0150870 A1 | 6/2009 | Bates | |
| 2011/0072309 A1 | 3/2011 | Sakai et al. | |
| 2011/0126176 A1 | 5/2011 | Kandasamy et al. | |
| 2011/0154111 A1 | 6/2011 | Beilmann et al. | |
| 2012/0131309 A1 | 5/2012 | Johnson et al. | |
| 2012/0291017 A1 | 11/2012 | Fuhrer et al. | |
| 2015/0033211 A1 | 1/2015 | Bates et al. | |
| 2015/0121127 A1 | 4/2015 | Jain | |
| 2015/0378870 A1 | 12/2015 | Marron et al. | |
| 2016/0292061 A1 | 10/2016 | Marron et al. | |
| 2017/0249230 A1 | 8/2017 | Tsirkin et al. | |
| 2017/0357446 A1* | 12/2017 | Moyer | G06F 12/0891 |

OTHER PUBLICATIONS

Marron, et al., "Time-Travel Debugging for JavaScript/HTML Applications", https://channel9.msdn.com/blogs/Marron/Time-Travel-Debugging-for-JavaScriptHTML, Published on: May 13, 2015, 12 pages.

"Chronon Time Travelling Debugger", http://chrononsystems.com/products/chronon-time-travelling-debugger, Retrieved on: Nov. 24, 2016, 5 pages.

Pandy, Laslo, "Elm's Time Traveling Debugger", http://web.archive.org/web/20140416213617/http:/debug.elm-lang.org/, Published on: Apr. 16, 2014, 6 pages.

Bhansali, et al., "Framework for instruction-level tracing and analysis of program executions", In Proceedings of the 2nd international conference on Virtual execution environments, Jun. 14, 2006, pp. 154-163.

Phang, et al., "Expositor: Scriptable time-travel debugging with first-class traces", In Proceedings of 35th International Conference on Software Engineering, May 18, 2013, pp. 352-361.

Haller, et al., "MemPick: High-Level Data Structure Detection in C/C++ Binaries", In Proceedings of 20th Working Conference on Reverse Engineering, Oct. 14, 2013, pp. 32-41.

Hearon, James, "A Pure Data Break Point Function patch", In Csound Journal, Issue 5, May 20, 2007, 3 Pages.

"International Search Report and Written Opinion Issued in PCT Application No. PCT/US17/068842", dated Jul. 3, 2018, 12 Pages.

"International Search Report and Written Opinion Issued in PCT Application No. PCT/US18/022084", dated Jun. 4, 2018, 13 Pages.

Phang, et al., "Expositor: Scriptable Time-travel Debugging with First-dass Traces", In Proceedings of the 2013 International Conference on Software Engineering, May 18, 2013, pp. 352-361.

* cited by examiner

EFFICIENT BREAKPOINT DETECTION VIA CACHES

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging, in which execution of a program is recorded/traced by a trace application into one or more trace files, which can be then be used to replay execution of the program later for forward and backward analysis. For example, "time travel" debuggers can enable a developer to set forward breakpoints/watchpoints (like conventional debuggers) as well as reverse breakpoints/watchpoints.

One challenge in implementing "time travel" debuggers involves how to detect when a point of interest (e.g., breakpoint/watchpoint) has been encountered during replay of a trace file in a flexible and performant manner. One mechanism that has been explored for tracking points of interest during replay is to use processor-implemented hardware breakpoints. While performant, use of hardware breakpoints has the disadvantages of severely limiting the number of breakpoints that can be concurrently watched for (e.g., four in INTEL processors), and inherently binds a debugger implementation to specifically supported hardware.

Another mechanism that has been explored is to use software breakpoints, in which each traced operation that accesses memory (e.g., a read or a write to memory storing data, or a read/fetch for execution from memory storing program code) is instrumented with additional code instructions that check whether or not the access would cause a breakpoint to be encountered. However, instrumentation has the severe disadvantage of causing a check for the occurrence of a breakpoint on every memory access, regardless of whether or not that memory access would actually encounter a breakpoint. In many environments, execution of the instrumented code instructions results in the use of tens to hundreds of additional processor cycles for each memory access, which has a significant detrimental effect on replay performance that is perceivable by a human user.

BRIEF SUMMARY

At least some embodiments described herein relate to use of a cache (e.g., a cache of a hardware or emulated processor, or some other cache memory structure) to detect when an access (e.g., for read, write, or fetch/execute) to a memory address that is being watched or monitored has occurred. In other words, the embodiments herein provide for efficient breakpoint detection through the use of a cache, to greatly limit the number of memory access operations for which a breakpoint check needs to be performed. As is described herein, embodiments enable breakpoints checks to be performed when a cache miss occurs. Thus, rather than preforming a breakpoint check on every memory access, embodiments herein limit breakpoint checks to only memory accesses that cause cache misses to occur. As compared to prior solutions, the embodiments herein can greatly reduce the overhead (e.g., extra processor cycles that check for the occurrence of a breakpoint) caused by a debugger when detecting breakpoints during a trace replay.

In some embodiments, monitoring a memory location through use of a cache includes identifying a memory address that is to be monitored and, based at least on identifying the memory address, storing the memory address in a monitoring list and determining whether any cache line(s) overlapping with the memory address already exist in a cache. If any such cache line(s) do exist in the cache, they are evicted from the cache. When the occurrence of a cache miss based on a memory access operation is detected, the embodiment includes determining whether a portion of another cache line imported into the cache based on the cache miss overlaps with the memory address stored in the monitoring list. When the portion of the imported cache line does overlap with the memory address, one or more monitoring operations are processed on the memory address and the imported cache line is evicted from the cache.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
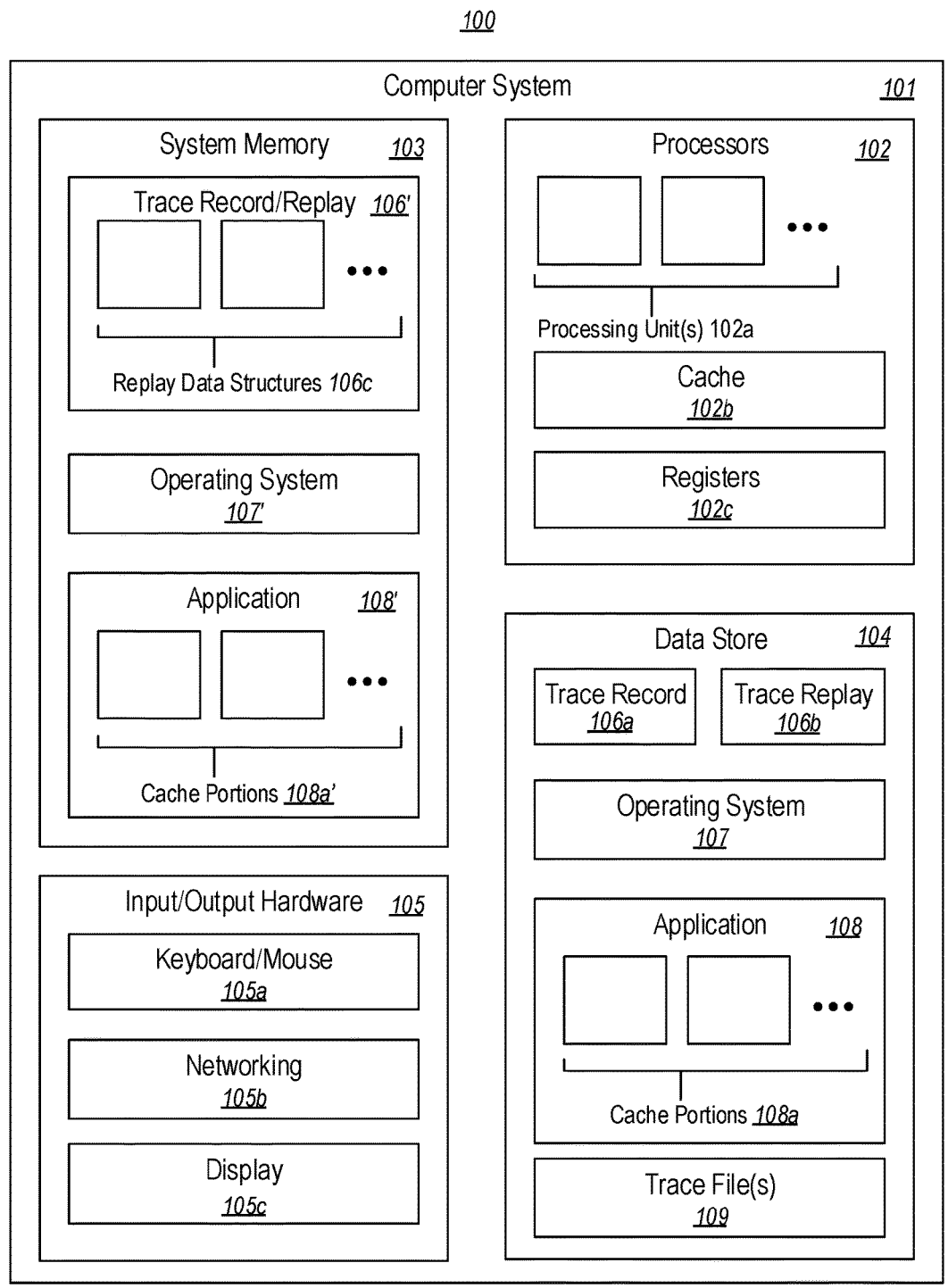
FIG. 1 illustrates an example computing environment that facilitates efficient breakpoint detection via caches.

At least some embodiments described herein relate to use of a cache (e.g., a cache of a hardware or emulated processor, or some other cache memory structure) to detect when an access (e.g., for read, write, or fetch/execute) to a memory address that is being watched or monitored has occurred. In other words, the embodiments herein provide for efficient breakpoint detection through the use of a cache, to greatly limit the number of memory access operations for which a breakpoint check needs to be performed. As is described herein, embodiments ensure that breakpoints checks need only be performed when a cache miss occurs. Thus, rather than preforming a breakpoint check on every memory access, embodiments herein limit breakpoint checks to only memory accesses that cause cache misses to occur. Thus, as compared to prior solutions, the embodiments herein can greatly reduce the overhead (e.g., extra processor cycles that check for the occurrence of a breakpoint) caused by a debugger when detecting breakpoints during a trace replay.

In particular, the embodiments herein operate to ensure that any cache line(s) corresponding to memory address(es) that are being monitored are evicted from the cache. For example, in accordance with the embodiments herein, when a new breakpoint is defined, a memory address that is to be monitored based on the breakpoint is added to a monitoring list. In addition, if there exists any cache line(s) in the cache that overlap with the memory address at the time the breakpoint is defined, they are evicted from the cache. When a cache miss occurs based on access to a memory address, a breakpoint check is performed. In particular, a cache line that was imported into the cache based on the cache miss is compared to the list of memory addresses in the monitoring list to determine if there is an overlap. If there is no overlap, then the cache miss is honored normally, and the cache line is permitted to remain in the cache. If there is an overlap, however, then one or more monitoring operations are performed (e.g., to determine if a breakpoint was actually encountered, and process the occurrence of breakpoint when they are encountered). Additionally, if there was an overlap, the cache line is evicted from the cache so that another cache miss will occur—and with it another breakpoint check will be performed—if the memory address is accessed again later. In this way, breakpoint checks only need to be performed for memory access operations that cause a cache miss to occur, rather than with each memory access operation.

As used in this description and in the claims, the terms "breakpoint" and "watchpoint" are used interchangeably, to refer to a point of interest that should cause replay to break/pause replay of executable code when encountered. In particular, a breakpoint/watchpoint can refer to a memory location corresponding to a particular portion of executable code (e.g., a line of code, a variable definition, a function definition, etc.) and/or a memory location corresponding to data stored by executable code (e.g., a memory location storing the value a variable, constant, data structure, etc.). Thus, a breakpoint/watchpoint may refer to a memory address of stored executable code and/or a memory address of runtime memory used by executing code.

Also, when referring to a "memory address" that is being monitored for a breakpoint/watchpoint, the embodiments herein are not limited to monitoring for the bytes at that single address. Instead, the embodiments monitor for an access to any given number of consecutive bytes starting at that address. Thus, any reference to monitoring "an address" or "a memory address" herein also refers to monitoring a range of a specified number of bytes starting at that address.

To the accomplishment of the foregoing, FIG. 1 illustrates an example computing environment 100 that facilitates efficient breakpoint detection via caches. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiment, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application code such as, for example, a trace record component 106a, a trace replay component 106b, an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime record/replay data 106' (including replay data structures 106c), runtime operating system data 107', and runtime application data 108' (including runtime variables, data structures, etc. of application 108 as it executes, as well as runtime code portions 108a' which are in-memory copies of code portions 108a).

The trace record component 106a is usable to trace execution of an application, such as application 108 including its executable code portions 108a, and to store trace data in the trace file(s) 109. In some embodiments, the trace record component 106a is a standalone application, while in other embodiments it is integrated into another software component, such as the operating system 107, a hypervisor, a debugging suite, etc. The trace record component 106a may also exist at an entirely different computer system. Thus, the trace record component 106a may trace execution of code at another computer system. Then, the trace file(s) 109 resulting from that tracing can be transferred (e.g., using the networking hardware 105b) to the computer system 101 for replay be the trace replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes a plurality of processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., trace record component 106a, trace replay component 106b, operating system 107, application code portions 108a, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108b' in a code cache section of the shared cache 102b, and stores other runtime application data 108' (e.g., variables, data structures, etc.) in a data cache section the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The trace replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the trace record component 106a may record execution of one or more code portions 108a of application 108 at the processor(s) 102, while storing trace data (e.g., memory values read by code instructions, register values supplied code instructions, etc.) in the trace files(s) 109. Then, the trace replay component 106b can re-execute the code portion(s) 108a at the processor(s) 102, while supplying that code with the trace data from the trace files(s) 109 so that the code is executed in the same manner that it was at trace time.

The trace replay component 106b also detects breakpoints in the code during replay, by performing breakpoint checks in connection with cache misses. For example, the trace replay component 106b may use a cache 102b at the processor, or may use some other cache, such as a cache stored in the system memory 103 as a replay data structure 106c.

Figure 2:
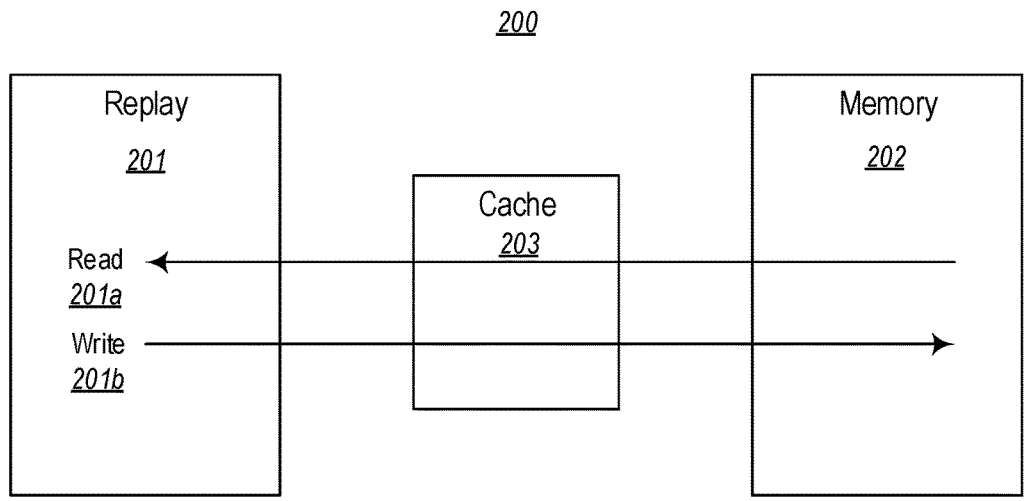
FIG. 2 illustrates an example embodiment of use of a replay component that uses a cache in connection with performing memory operations.

FIG. 2 illustrates an example embodiment 200 of use of a replay component that uses a cache in connection with performing memory operations. In particular, the embodiment 200 of FIG. 2 illustrates a replay component 201 (e.g., such as trace replay component 106b of FIG. 1) that performs read 201a and/or write 201b operations on a memory 202. The memory 202 may comprise a portion of system memory 103 of FIG. 1. In some embodiments, the memory 202 comprises a data structure maintained by the replay component 201 (e.g., such as a replay data structure 106c) that reproduces the memory reads and/or writes actually observed during a trace. Thus, for example, the memory 202 may comprise a replay data structure 106c comprising an entire copy of memory that was addressable by the executable entity being traced, a cache data structure that reproduces the reads seen by the entity being traced, etc.

Memory 202 includes both memories storing the code of the executable entity (e.g., a code portion 108a') as well as operating memory used by the code of the executable entity. Thus, a read 201a operation may comprise a code read that obtains executable instructions from the memory 202, and/or a data read that obtains runtime data (e.g., variables or other data structures) stored in the memory 202. A write 201b operation may comprise a data write that stores runtime data in the memory 202. While FIG. 2 depicts read 201a and write 201b operations, it will be appreciated that that, when a memory access operation is accessing code data, a processor may treat the operation as an "execute" or a "fetch" operation. As used in this description and in the claims, a read 201a operation should be construed to comprise an "execute" and/or a "fetch" memory access operation in appropriate circumstances, such as when the operation is accessing code data.

As depicted in FIG. 2, the replay component 201 performs the read 201a and write 201b operations through a cache 203. In general, the cache 203 operates in a similar manner to a processor cache (e.g., cache 102b of FIG. 1). Thus, in general, the cache 203 stores a plurality of cache lines, each which can be associated with a memory address (e.g., in system memory 103), and store a cached copy of a portion of memory starting at that memory address and potentially spanning several memory addresses (depending on the size of the cache line). Thus, each cache line can contain data stored at a plurality of memory addresses.

In addition to using the cache 203 in conventional ways, the replay component 201 also uses the cache 203 in a manner that facilitates performing breakpoint checks only when cache misses occur. In particular, the replay component 201 ensures that any cache lines that include data overlapping with memory addresses stored in a watch or monitoring list (e.g., a replay data structure 106c) remain evicted from the cache. Thus, the replay component 201 evicts any cache line(s) that overlap with a memory address that is the subject of a breakpoint when that breakpoint is first added to the monitoring list, and also evicts any cache line that is imported due to a cache miss when it overlaps with any memory address that is in the monitoring list. This is described in connection with FIG. 3, which illustrates an example embodiment of a replay component 300 (e.g., corresponding to the trace replay component 106b of FIG. 1, or the replay component 201 of FIG. 2).

Notably, while the embodiments of monitoring a memory location through use of a cache are described, for ease in description, in the context of replay (i.e., the trace replay component 106b/replay component 300), it will be appreciated that such embodiments are also applicable in the context of recording (i.e., trace record component 106a). For example, at record time, a debugging application may also monitor memory locations to identify the encounter of breakpoints/watchpoints. Thus, the component and acts described in connection with the trace replay component 106b/replay component 300 are equally applicable to the trace record component 106a.

Figure 3:
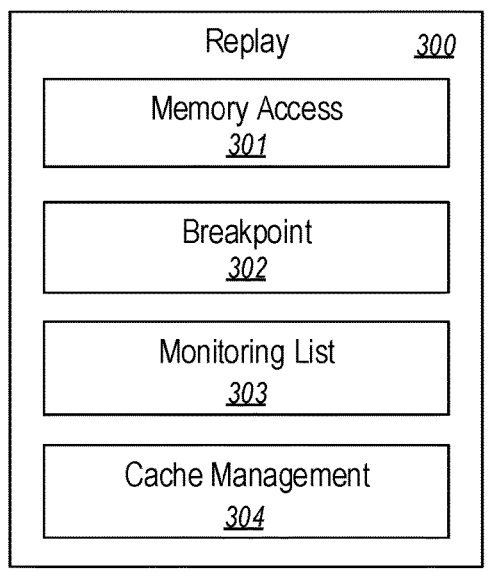
FIG. 3 illustrates an example embodiment of a replay component.

As depicted in FIG. 3, the replay component 300 can include a number of sub-components, such as, for example, a memory access component 301, a breakpoint component 302, a monitoring list component 303, and/or a cache management component 304. The depicted identity and arrangement of sub-components 302-304 are merely one example as an aide in description, and one of ordinary skill in the art will recognize that the particular identity and number of sub-components of the replay component 300 can vary greatly based on implementation.

The memory access component 301 performs memory operations, such as reads 201a and/or writes 201b, to the memory 202 through the cache 203 in order to conduct a replay based on a trace file 109. For example, based on code (e.g., code portions 108a) being replayed and/or based on data in the trace file(s) 109, the memory access component 301 may perform memory reads 201a and/or writes 201b to memory 202.

The breakpoint component 302 manages breakpoints defined in a debugging application (e.g., one containing the replay component 300), such as user-defined breakpoints/watchpoints on a code portion 108a that is being replayed or a memory address storing a variable or data structure defined by the code portion 108a. Thus, when a breakpoint/watchpoint is defined, the breakpoint component 302 identifies corresponding a memory address of interest in the memory 202. After identifying a memory address of interest, the breakpoint component 302 uses the monitoring list component 303 to store that address in a monitoring list. As mentioned above, the term "memory address" also refers to a range of consecutive bytes starting at that memory address. As such, the breakpoint component 302 can store in the monitoring list both the base address to monitor, as well as a number of bytes to monitor starting at that address. The breakpoint component 302 also requests that memory addresses be removed from the monitoring list when they are no longer needed, such as when a user-defined breakpoint/watchpoint is removed.

As is discussed in more detail in connection with the description of the cache management component 304 and FIG. 4, the breakpoint component 302 also uses the monitoring list to perform a breakpoint check upon the occurrence of a cache miss, to determine if a breakpoint/watchpoint may have been encountered. When a breakpoint/watchpoint may have been encountered, the breakpoint component 302 may also perform one or more monitoring operations, including operations to determine if a breakpoint was actually encountered and to remove an imported cache line from the cache.

The monitoring list component 303 receives one or more memory addresses of interest from the breakpoint component 302, and stores each of those addresses (and potentially a number of bytes to monitor starting at each address) in a monitoring list, such as a replay data structure 106c stored by the trace replay component 106b in the system memory 103. The monitoring list component 303 also removes memory addresses of interest from the monitoring list upon request from the breakpoint component 302. Addresses in the monitoring list can be stored in any appropriate data structure, such as an array, a linked-list, a hierarchical structure, etc. that facilitates an implementation goal, such as fast searching, efficient memory usage, speed in adding/removing addresses, etc.

During operation of the memory access component 301, the cache management component 304 imports portions of the memory 202 into the cache 203 and evicts portions of the memory 202 from the cache 203, as appropriate. As mentioned above, the cache 203 generally operates in a manner similar to processors caches. Thus, the cache management component 304 manages the cache 203 such that it stores recently accessed portions of memory 202 in addressable lines of data in the cache 203. As such, when the memory access component 301 accesses (e.g., performs a read 201a or a write 201b operation on) a memory address in the memory 202 that is not yet in the cache 203, a "cache miss" occurs, and a portion of data starting at that memory address (and potentially spanning a plurality of memory addresses) is imported into one of the lines of the cache 203. Then, subsequent operations to that memory address are performed by the memory access component 301 on that line of data in the cache 203. If a cache miss occurs when all the lines in the cache 203 are full, then a line (e.g., the least recently accessed) is "evicted" back to the memory 202 so that new data can be imported into the cache 203.

However, in addition to performing these standard cache functions, the cache management component 304 also operates in connection with the breakpoint component 302 and the monitoring list component 303 to ensure that any cache line(s) imported into the cache 203 that overlap with a memory address (including a specified number of consecutive bytes starting at that memory address) that is the subject of a breakpoint/watchpoint are evicted from the cache 203 (whether or not a beakpoint/watchpoint was actually encountered). As indicated previously, embodiments operate to ensure that any cache lines that include data overlapping with memory addresses stored in the monitoring list remain evicted from the cache.

Thus, in connection with the breakpoint component 302 identifying a new breakpoint/watchpoint, and the monitoring list component 303 adding a memory address of interest corresponding to that breakpoint/watchpoint to a monitoring list, the cache management component 304 evicts any cache line(s) from the cache 203 that overlap with that memory address, if they exist in the cache 203. This ensures that a cache miss will occur the next time a cache line that overlaps with the memory address is later imported into the cache 203. Note that, when it is added to the monitoring list, a memory address (including a number of bytes starting at that address) may overlap with a single cache line already in the cache, or multiple cache lines already in the cache, and thus multiple cache lines could be evicted. For example, a number of bytes being monitored at an address, cache line size, and/or where in a cache line a memory address (including range of bytes) of interest begins, that data relevant to a single address of interest may span two (or more) cache lines.

In addition, upon detecting the occurrence of a cache miss, the cache management component 304 notifies the breakpoint component 302 of the cache miss (so that the breakpoint component 302 can determine if there is an overlap and potentially perform one or more monitoring operations). Then, based on instructions received from the breakpoint component 302, the cache management component 304 evicts a cache line imported into the cache 203 in connection with the cache miss when that cache line overlaps with an address in the monitoring list.

Figure 4:
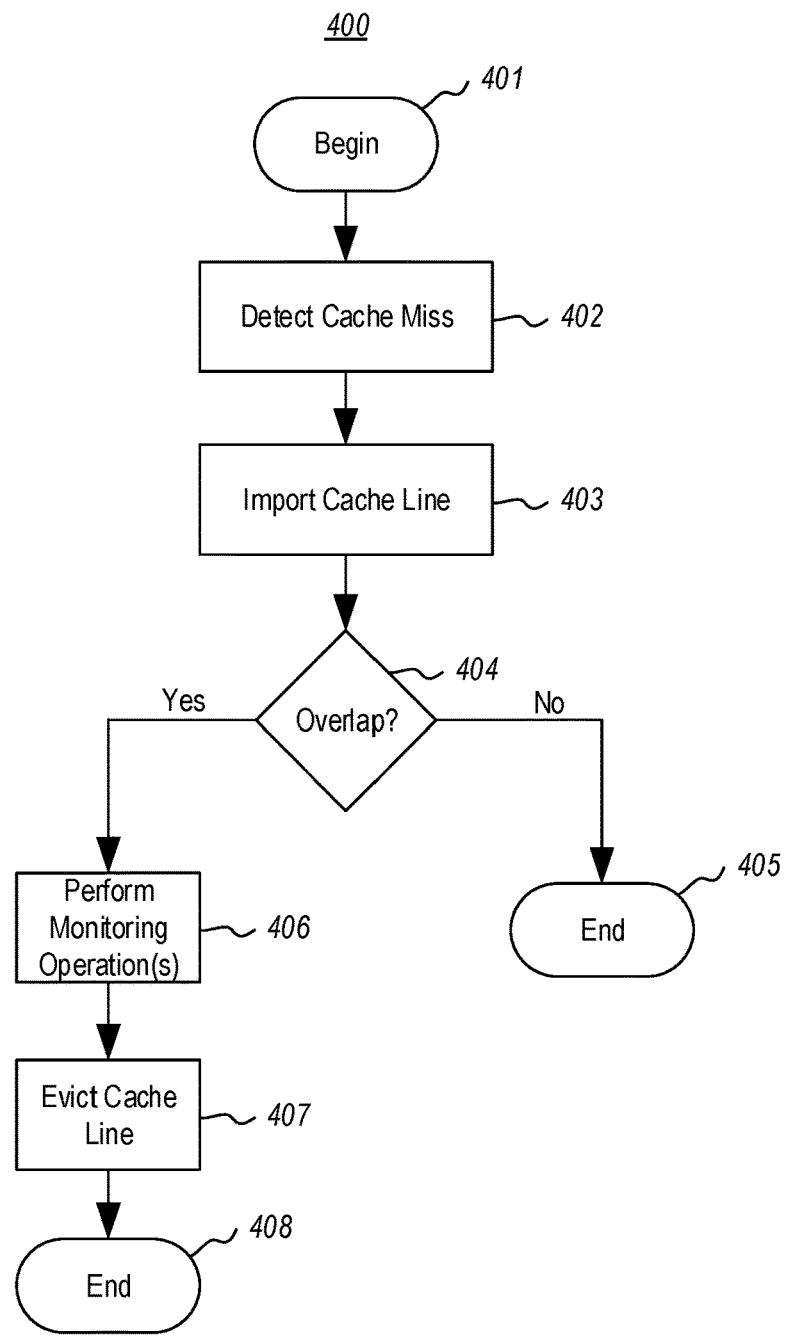
FIG. 4 illustrates an example flowchart of performing a breakpoint check upon the occurrence of a cache miss.

For example, FIG. 4 illustrates an example flowchart 400 of performing a breakpoint check upon the occurrence of a cache miss. Flowchart 400 begins at block 401 and proceeds to block 402 of detecting a cache miss. For example, block 402 may occur upon the memory access component 301 performing a memory access operation (e.g., read 201a and/or write 201b) on a memory address that is not yet cached in the cache 203. Thus, a cache miss occurs, and at block 403 the cache management component 304 imports a cache line into the cache 203, which cache line contains data from the memory 202 that corresponds to the memory access operation.

Based on the occurrence of blocks 402 and/or 403, the cache management component 304 also notifies the breakpoint component 302 of the cache miss. Thus, at decision block 404, the breakpoint component 302 then performs an overlap check to determine whether a breakpoint may have been encountered (i.e., "yes" from decision block 404) or has not been encountered (i.e., "no" from decision block 404). An overlap check comprises the breakpoint component 302 comparing addresses in the monitoring list with memory addressees stored in the cache line that was imported in block 403. If there is an overlap, then a breakpoint may have been encountered. If there is no overlap, then no breakpoint has been encountered.

The overlap check may comprise a check on the cache line address associated with the cache line, and/or an analysis of any additional addresses also covered by data stored in the cache line (e.g., those addresses subsequent to the cache line address in memory that would also be in the cache line). Thus, when determining if a monitored addresses in the monitoring list overlaps with the imported cache line, the overlap check may comprise determining if the cache line address of the imported cache line corresponds to the cache line address of a cache line that was previously evicted from the cache when the monitored addresses was added to the monitoring list, and/or determining if the monitored addresses would be an address covered by a cache line even though it is not the cache line address.

As depicted, if the breakpoint component 302 determines that a breakpoint does not overlap with the cache line (i.e., because no address in the monitoring list overlaps with addresses in the imported cache line), the flowchart 400 ends at 405. This, in this case, the cache miss is honored normally, since the imported cache line remains in the cache 203. Thus, for example the breakpoint component 302 may notify the cache management component 304 to leave the imported cache line in the cache 203, so the management component 304 leaves the imported cache line in the cache 203.

If, however, the breakpoint component 302 determines that a breakpoint may have been encountered (i.e., because an address in the monitoring list overlapped with addresses in the imported cache line), the flowchart 400 proceeds to blocks 406 of performing monitoring operation(s) and 407 of evicting the cache line, and then ends at block 408. Note that, even though the cache line that was imported into the cache may include a memory address that overlaps with a particular memory address that is in the monitoring list, the code that is being replayed may not actually access that particular memory address from the cache line (and thus a breakpoint may not actually be encountered). This is because, as discussed previously, a cache line can contain data corresponding to a plurality of memory addresses, including the particular memory address. Thus, the particular memory address that is being watched may have been imported into the cache line as a result of a memory access operation to a memory address other than the particular memory address.

In block 406, the breakpoint component 302 performs one or more monitoring operations. These operation(s) may include operations that determine if the monitored memory address that is the subject of the breakpoint/watchpoint was actually encountered, reporting that encounter (e.g., at a user interface in a debugging application), and/or causing the cache line to be evicted by block 407. The particular operation(s) performed may vary based on the nature of the memory access operation (read 201a or write 201b) that caused the cache miss.

For example, if the operation that caused the cache miss was a read from data or a write to data, the operation(s) may 1) put the processor(s) 102 in verbose mode, single-step the processor(s) 102 one processor instruction, 2) examine a log of execution of the instruction (made due to the processor(s) being put into verbose mode) to determine if the breakpoint was encountered (i.e., to determine if the monitored memory address was read from or written to), and 3) cause the cache line to be evicted (block 407). The operation(s) may also report results (e.g., at a user interface of a debugging application). Thus, these operations would cause a breakpoint check for a read or write to data to occur after read or write happens. However, these operations could be varied so that the opposite is true (i.e., so that the breakpoint check occurs before the read or write happens).

In some situations, the "monitoring operations" of block 406 may determine that a breakpoint was encountered without actually doing any monitoring. For example, the monitoring operations could determine that a breakpoint was encountered when the monitored range of bytes starting at a subject memory address covers the entire imported cache line, and that the proper type of operation is performed (e.g., the monitored memory address is being monitored for a read, and a read occurs). Thus, although referred to as "monitoring operations" in this description, the operations in block 406 can include any operation(s) for determining if a breakpoint was encountered, even if no actual monitoring is performed.

After performance of the monitoring operations(s) in block 406, in block 407 the cache management component 304 evicts the imported cache line in the cache 203 upon notification to do so from the breakpoint component 302. Notably, the imported cache line is removed from the cache 203 whether or not a breakpoint was actually encountered (as determined by the monitoring operation(s) in block 406). This is because the replay component 300 ensures that any cache line that overlaps with any watched-for memory address is evicted from the cache, so that a breakpoint check for each watched-for memory address is performed every time there is a cache miss that overlaps with a watched-for memory address.

Some embodiments may implement some cache optimizations to further increase the performance of monitoring a memory location through use of a cache, and/or reduce cache usage. For example, some embodiments may import cache lines into memory designated for monitoring, rather than a normal cache. Thus, an "eviction" could comprise dereferencing the location of a cache line in the designated memory or otherwise invalidating it, rather than performing an actual cache eviction operation. Other embodiments may import a cache line into a cache, but then move it to another temporary memory location for monitoring, and evict it from that temporary memory location. Thus, the term "eviction" should be interpreted as any operation that would invalidate a cache line, whether that eviction actually performs an eviction operation on a cache.

Some embodiments also merge cache misses. For example, if a cache line is frequently accessed (e.g., as part of a loop, function, etc.), some embodiments may refrain from evicting the cache line during these frequent accesses, perform monitoring operations on the cache line while it is present the cache, and then evict it after the frequent accesses cease. Different heuristics could be used to determine if a cache line should be treated as frequently accessed. For example, cache lines for data breakpoints on a thread's stack may be retained while executing a function owning that stack frame, cache lines for breakpoints within a function may be retained while executing code of the function, etc.

Figure 5:
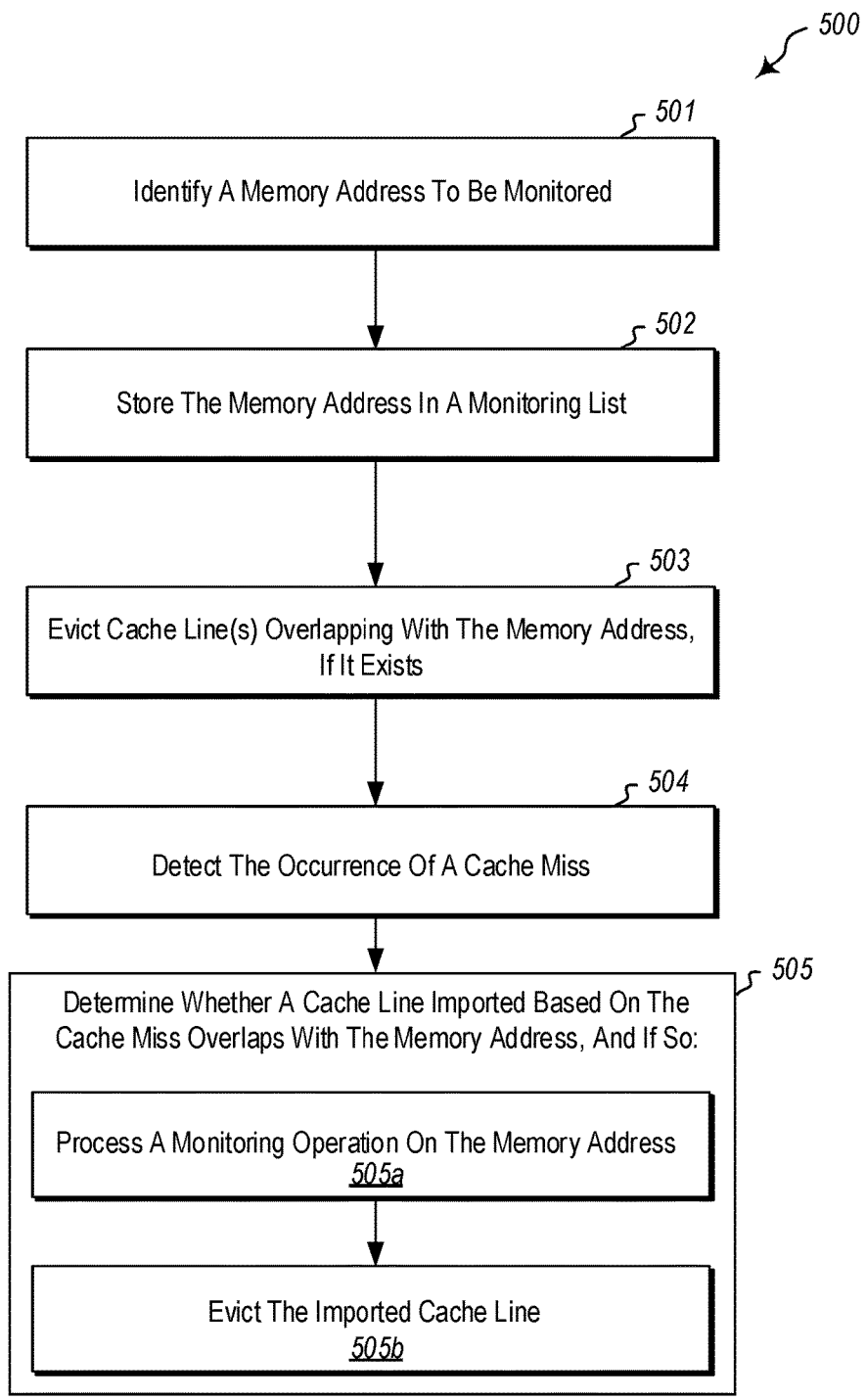
FIG. 5 illustrates an example flowchart of a method for monitoring a memory location through use of a cache.

In view of the forgoing, FIG. 5 illustrates an example flowchart of a method 500 for monitoring a memory location through use of a cache. FIG. 5 is described in connection with the components and data described in connection with FIG. 1-4. While method 500 is illustrated as a series of acts, the particular ordering of the acts in the method 500 is not limited to the ordering shown.

As illustrated, method 500 includes an act 501 of identifying a memory address to be monitored. For example, act 501 can comprise the breakpoint component 302 identifying that a breakpoint/watchpoint has been defined (e.g., by user input at a debugging software application). In connection with the watchpoint being defined, the breakpoint component 302 can identify a memory address that is to be monitored as a result of the breakpoint/watchpoint. The memory address may comprise a memory address corresponding to stored code that is being replayed (e.g., a runtime code portion 108a') or corresponding to runtime memory used by the code (e.g., runtime application data 108').

Method 500 also includes an act 502 of storing the memory address in a monitoring list. Act 502 can comprise, based at least on identifying the memory address, storing the memory address in a monitoring list. For example, based on the breakpoint component 302 identifying the memory address that is to be monitored as a result of the breakpoint/ watchpoint, the monitoring list component 303 can store that memory address in a monitoring list (including a number of bytes to monitor starting at that address), such as a replay data structure 106c. This monitoring list may be stored using an array, a linked-list, a hierarchical structure, etc. depending on implementation.

Method 500 also includes an act 503 of evicting cache line(s) overlapping with the memory address, if they exist. Act 503 can comprise, based at least on identifying the memory address, determining whether one or more cache lines overlapping with the memory address already exist in a cache, and when the one or more cache lines exist, evicting the one or more cache lines from the cache. For example, in connection with the breakpoint component 302 identifying the memory address that is to be monitored as a result of the breakpoint/watchpoint, and with the monitoring list component 303 storing that memory address in a monitoring list, the cache management component 304 evicts any cache lines from the cache 203 that overlap with that memory address (including the specified range of bytes starting at that address), if they exist in the cache 203. In some embodiments, this is done upon an instruction by the breakpoint component 302 to the cache management component 304. Doing so ensures there will be cache miss when a memory access operation on the identified memory address occurs.

Method 500 also includes an act 504 of detecting the occurrence of a cache miss. Act 504 can comprise detecting the occurrence of a cache miss based on a memory access operation. For example, based on a memory access operation by the memory access component 301 accessing portion of the memory 202 that is not already in the cache 203, the cache management component 304 can register a cache miss on the cache 203, and import that portion of the memory 202 into a cache line in the cache 203.

Method 500 also includes an act 505 of determining whether a cache line imported based on the cache miss overlaps with the memory address. Act 505 can comprise, based at least on occurrence of the cache miss, determining whether a portion of a cache line imported into the cache based on the cache miss overlaps with the memory address stored in the monitoring list. For example, upon the occurrence of the cache miss in act 504, the cache management component 304 can notify the breakpoint component 302 of the cache miss. The breakpoint component 302 can, in turn, compare the cache line imported based on the cache miss with the monitoring list to determine if any address (including their specified ranges) in the monitoring list overlaps with the cache line.

As illustrated, act 504 includes an act 505a of processing a monitoring operation on the memory address. Act 505a can comprise, when the portion of the imported cache line does overlap with the memory address, processing one or more monitoring operations on the memory address. For example, if the breakpoint component 302 determined in act 505 that the cache line imported into the cache based on the cache miss does overlap with a memory address stored in the monitoring list, the breakpoint component 302 can process one or more monitoring operations, such as determining putting the processor(s) 102 into verbose mode, single-stepping the processor(s) 102, reporting results, etc. As discussed, an overlap may occur even if a watched-for memory address is not actually accessed. Thus, in these situations, processing one or more monitoring operations on the memory address may comprise determining that a breakpoint was not encountered when the memory address was not written to or read by the memory access operation. Alternatively, if a breakpoint was encountered, the one or more monitoring operations could include reporting results of the breakpoint check at a user interface (e.g., to indicate that the breakpoint was encountered).

Act 504 also includes an act 505b of evicting the imported cache line. Act 505b can comprise, when the portion of the imported cache line does overlap with the memory address, evicting the second cache line from the cache. Alternatively, when the portion of the imported cache line does not overlap with the memory address, the second cache line remains in the cache. For example, if the breakpoint component 302 determined in act 505 that the cache line imported into the cache based on the cache miss does overlaps with a memory address stored in the monitoring list, the breakpoint component 302 can instruct the cache management component 304 to evict that line from the cache. Notably, the cache line is removed from the cache whether or not a breakpoint was actually encountered (e.g., as determined in act 505a). This is because the replay component 300 ensures that any cache line that overlaps with any watched-for memory address is evicted from the cache, so that a breakpoint check for each watched-for memory address is performed every time there is a cache miss that implicates a watched-for memory address.

Accordingly, the embodiments described herein ensure that any cache line(s) corresponding to memory address(es) that are being monitored are evicted from the cache, so that breakpoint checks are performed only on cache misses. Thus, when a new breakpoint is defined, a memory address that is to be monitored based on the breakpoint is added to a monitoring list, and if there exists any cache line(s) in the cache that overlap with the memory address at the time the breakpoint is defined, they are evicted from the cache. Then, when a cache miss occurs based on access to a memory address, a breakpoint check is performed. In particular, a cache line that was imported into the cache based on the cache miss is compared to the list of memory addresses in the monitoring list to determine if there is an overlap. If there is no overlap, then the cache miss is honored normally, and the cache line is permitted to remain in the cache. If there is an overlap, however, then one or more monitoring operations are performed. Additionally, whenever if there was an overlap, the cache line is evicted from the cache so that another cache miss will occur—and with it another breakpoint check will be performed—if the memory address is accessed again later. In this way, breakpoint checks only need to be performed for memory access operations that cause a cache miss to occur, rather than with each memory access operation.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for monitoring a memory location for occurrence of a breakpoint through use of a cache during debugging, the method comprising:
  identifying a memory address that is to be monitored;
  based at least on identifying the memory address that is to be monitored, performing at least the following:
    storing the memory address in a breakpoint monitoring list; and
    ensuring that any cache lines overlapping with the memory address are evicted from a cache, including:
      determining whether one or more cache lines overlapping with the memory address already exist in the cache, and
      when the one or more cache lines already exist in the cache, and based on the memory address being stored in the breakpoint monitoring list, evicting the one or more cache lines from the cache;
  during debugging, detecting the occurrence of a cache miss based on a memory access operation; and
  based at least on occurrence of the cache miss, determining whether a portion of a cache line imported into the cache based on the cache miss overlaps with the memory address stored in the breakpoint monitoring list, and when the portion of the imported cache line does overlap with the memory address, performing at least the following:
    processing one or more monitoring operations on the memory address; and
    based on the memory address being stored in the breakpoint monitoring list, evicting the imported cache line from the cache.

2. The method as recited in claim 1, wherein the one or more monitoring operations include putting at least one of the one or more processors in verbose mode and single-stepping the at least one processor.

3. The method as recited in claim 1, wherein determining whether a portion of a cache line imported into the cache based on the cache miss overlaps with the memory address stored in the breakpoint monitoring list comprises determining whether the imported cache line includes a memory address matching the memory address stored in the breakpoint monitoring list.

4. The method as recited in claim 1, wherein when the portion of the imported cache line does not overlap with the memory address, the imported cache line remains in the cache.

5. The method as recited in claim 1, wherein processing one or more monitoring operations on the memory address comprises determining that a breakpoint was encountered when the memory address was written to or read by the memory access operation.

6. The method as recited in claim 1, wherein processing one or more monitoring operations on the memory address comprises determining that a breakpoint was not encountered when the memory address was not written to or read by the memory access operation.

7. The method as recited in claim 1, wherein the memory access operation comprises at least one of a data read, a data write, or a code execute access operation.

8. The method as recited in claim 1, further comprising merging cache misses for a plurality of memory operations by performing monitoring operations on a cache line accessed by the plurality of memory operations, while refraining from evicting the cache line during the plurality of memory operations.

9. The method as recited in claim 1, wherein storing the memory address in a breakpoint monitoring list comprises storing the memory address in a breakpoint monitoring list that includes a plurality of monitored memory addresses.

10. The method as recited in claim 1, wherein the one or more monitoring operations include reporting results of a breakpoint check at a user interface.

11. A computer system, comprising:
one or more processors; and
one or more hardware storage devices having stored thereon instructions that are executable by the one or more processors to cause the computer system to monitor a memory location for occurrence of a breakpoint through use of a cache during debugging, the instructions including instructions that are executable to cause the computer system to perform at least the following:
identify a memory address that is to be monitored;
based at least on identifying the memory address that is to be monitored, perform at least the following:
store the memory address in a breakpoint monitoring list; and
ensure that any cache lines overlapping with the memory address are evicted from a cache, including:
determining whether one or more cache lines overlapping with the memory address already exist in a cache, and
when the one or more cache lines already exist in the cache, and based on the memory address being stored in the breakpoint monitoring list, evicting the one or more cache lines from the cache;
during debugging, detect the occurrence of a cache miss based on a memory access operation; and
based at least on occurrence of the cache miss, determine whether a portion of a cache line imported into the cache based on the cache miss overlaps with the memory address stored in the breakpoint monitoring list, and when the portion of the imported cache line does overlap with the memory address, perform at least the following:
process one or more monitoring operations on the memory address; and
based on the memory address being stored in the breakpoint monitoring list, evict the imported cache line from the cache.

12. The computer system as recited in claim 11, wherein the one or more monitoring operations include putting at least one of the one or more processors in verbose mode and single-stepping the at least one processor.

13. The computer system as recited in claim 11, wherein determining whether a portion of a cache line imported into the cache based on the cache miss overlaps with the memory address stored in the breakpoint monitoring list comprises determining whether the imported cache line includes a memory address matching the memory address stored in the breakpoint monitoring list.

14. The computer system as recited in claim 11, wherein when the portion of the imported cache line does not overlap with the memory address, the imported cache line remains in the cache.

15. The computer system as recited in claim 11, wherein processing one or more monitoring operations on the memory address comprises determining that a breakpoint was encountered when the memory address was written to or read by the memory access operation.

16. The computer system as recited in claim 11, wherein processing one or more monitoring operations on the memory address comprises determining that a breakpoint was not encountered when the memory address was not written to or read by the memory access operation.

17. The computer system as recited in claim 11, wherein the memory access operation comprises at least one of a data read, a data write, or a code execute access operation.

18. The computer system as recited in claim 11, the instructions including instructions that are executable to cause the computer system to merge cache misses for a plurality of memory operations by performing monitoring operations on a cache line accessed by the plurality of memory operations, while refraining from evicting the cache line during the plurality of memory operations.

19. The computer system as recited in claim 11, wherein storing the memory address in a breakpoint monitoring list comprises storing the memory address in a breakpoint monitoring list that includes a plurality of monitored memory addresses.

20. A computer program product comprising one or more hardware storage devices having stored thereon instructions that are executable by one or more processors to cause a computer system to monitor a memory location for occurrence of a breakpoint through use of a cache during debugging, the instructions including instructions that are executable to cause the computer system to perform at least the following:
identify a memory address that is to be monitored;
based at least on identifying the memory address that is to be monitored, perform at least the following:
store the memory address in a breakpoint monitoring list; and
ensure that any cache lines overlapping with the memory address are evicted from a cache, including:
determining whether one or more cache lines overlapping with the memory address already exist in a cache, and when the one or more cache lines already exist in the cache, and based on the memory address being stored in the breakpoint monitoring list, evicting the one or more cache lines from the cache;
detect the occurrence of a cache miss based on a memory access operation; and
based at least on occurrence of the cache miss, determine whether a portion of a cache line imported into the cache based on the cache miss overlaps with the memory address stored in the breakpoint monitoring list, and when the portion of the imported cache line does overlap with the memory address, perform at least the following:
  process one or more monitoring operations on the memory address; and
  based on the memory address being stored in the breakpoint monitoring list, evict the imported cache line from the cache.

\* \* \* \* \*